United States Patent [19]

Dorman et al.

[11] Patent Number: 4,761,609
[45] Date of Patent: Aug. 2, 1988

[54] TACHOMETER SIGNAL CONDITIONER

[75] Inventors: Richard A. Dorman, Troy; Donald E. Welch, Latham, both of N.Y.

[73] Assignee: Mechanical Technology Incorporated, Latham, N.Y.

[21] Appl. No.: 87,402

[22] Filed: Aug. 20, 1987

[51] Int. Cl.⁴ .............................................. G01R 7/14
[52] U.S. Cl. .................................. 324/208; 340/671; 324/164; 307/351
[58] Field of Search ............... 324/160, 164, 166, 168, 324/208; 340/658, 648, 671; 361/239, 240; 73/660; 250/231 SE; 364/565; 307/351, 358

[56] References Cited

U.S. PATENT DOCUMENTS 4,072,893 2/1978 Huwyler ........................... 340/671
4,680,721 7/1987 Pluddemann ..................... 324/160

Primary Examiner—Reinhard J. Eisenzopf
Assistant Examiner—Anthony L. Miele
Attorney, Agent, or Firm—Joseph V. Claeys; Joseph C. Sullivan

[57] ABSTRACT

A tachometer signal conditioner circuit functions to accept a wide range of input signals and produces a digital pulse signal which indicates a gear shaft phase reference position. Tachometer input signals of either a true 1/revolution or an N/revolution signal with a single pulse or N pulses of different amplitude than the other pulses during the same shaft revolution can be used. The circuit comprises tachometer signal conditioner circuitry for amplifying and filtering the input from the tachometer, tachometer signal detector circuitry to produce digital pulses synchronous with the tachometer signal cycles and to detect the occurrence of a tachometer signal with a different amplitude during each 1/revolution or N/revolution period, a blanking signal generator which prevents tachometer signal noise from generating spurious 1/rev pulses during operation in the N/rev mode, and an output driver which produces signals to the remaining signal circuitry and to a front panel indicator lamp. One application of the circuit is to direct the distribution of balance weights in an airplane engine.

5 Claims, 1 Drawing Sheet

TACHOMETER SIGNAL CONDITIONER

BACKGROUND OF THE INVENTION

1. Field of The Invention

The invention relates to a tachometer signal conditioner circuit which accepts a wide range of input signals and produces a digital pulse signal which indicates a shaft phase reference position.

2. Description of The Prior Art

Historically there has been a need in data acquisition and analysis systems for a data signal that could produce both a single pulse per revolution of the machine shaft and multiple pulses per revolution of the same shaft. A typical area where such a need would exist would be with regard to aircraft engines where multiple pulses could indicate the revolution speed of the engine and a single pulse could produce a phase reference signal which is required to perform calculations that will specify the proper location of the balance weights to balance the engine.

In response to the above need, some aircraft engine manufacturers have designed in a discrete reference signal (1/revolution signal), but since magnetic transducers are generally used, the signals vary in amplitude as the engine speed changes.

Other engine manufacturers measure engine speed by designing in a multiple pulse per revolution (N/revolution signal) and then making one pulse different (e.g., higher, lower, narrower, wider) to use as a phase reference signal. These N/revolution signals are also based on the use of a magnetic sensor observing the passage of teeth on a multi-toothed wheel and thus suffer the same variable voltage characteristics with engine speed changes. Although these manufacturers generally offer a means for detecting the odd pulse for the reference signal, the method offered only works on their particular wheel design.

Still other manufacturers design in the N/revolution speed signal and give no thought to its possible use as a phase reference. For these cases, it is generally possible to shave a tooth shorter to create an odd tooth reference pulse.

Finally, some engines designed do not use that 1/revolution or N/revolution pulse signal at all, but instead provide a variable voltage sinusoidal signal (a "tachometer generator sensor") at a frequency corresponding to the engine speed. As the engine speed increases, these sensors generally begin to saturate their internal circuits and thus the sine wave progressively turns into a square wave.

Thus a need exists for an electronic circuit that could accept the aforementioned diverse range of possible input signals (in addition to other signal types that might be encountered in the future) and to reliably produce a 1/revolution output reference signal. Additional requirements were that the circuit was required to be almost entirely automatic in that an operator would not be required to make complicated adjustments or settings and that the circuit needed to automatically sense whether the input was from the high or low odd-tooth signal and be able to accept a wide range of input voltages, frequencies, and signal types.

OBJECTIVES AND SUMMARY OF THE INVENTION

It is a primary objective of the present invention to provide a tachometer signal conditioner circuit which produces a reliable 1/revolution signal over a wide range of input voltages, frequencies, and signal types.

It is a further object of the invention to provide a signal conditioner circuit which is almost entirely automatic in that an operator is not required to make any complicated adjustments or settings.

These and other objects and advantages of the invention will become apparent from the following summary.

The primary feature of the tachometer signal conditioner circuit of the present invention is the detection of the tachometer signal peak value changes that occur between subsequent gear tooth cycles. Changes in both the positive and the negative peak values of the tachometer signal are detected and voltage sensing circuitry tests for large changes between sequential values. A cyclic operation for both positive and negative peak values is performed in which a newly detected peak value is compared to the stored value of the preceding signal peak to determine if a large peak value change has occurred. If the difference between the peak values is small, the new peak value is stored in place of the previous peak value. If the difference between the peaks is sufficiently large to indicate the sensing of an odd height 1/revolution tooth, an output pulse is produced to indicate the presence of this tooth. The detection process is then turned off for a preset number of subsequent gear tooth cycles to improve the reliability of the detection process by eliminating false triggering on spurious noise pulses.

If the exact number of gear teeth is known, the detection process can be turned off for most of the 1/rev cycle to improve the rejection of noise pulses. Although a thumbwheel switch on the generator panel could be used to set the number of gear tooth cycles during which the detection process is turned off after the presence of an odd tooth is detected, the present invention provides a simplified interface requiring less operator intervention by having an additional circuit which detects the exact gear tooth count. This circuit operates by comparing a number of gear tooth count sequences between subsequent odd-tooth detection events. The detected gear-tooth count value will replace the panel switch setting data used to control the preset count value. The comparison of the gear tooth count occurs over 16 1/rev cycles. When 16 sequential cycles are found to have the identical count value, the detected tooth count value is stored for use during the balancing test. At the initiation of each new balancing test, a new gear tooth count will be determined for the duration of the test.

As was stated previously, the tachometer signal conditioner accepts a wide range of unit signals and produces a digital pulse signal which indicates a shaft phase reference position. Tachometer input signals of either a true 1/revolution or N/revolution signal with a single pulse of different amplitude can be used. Selection of the 1/revolution or N/revolution signal conditioning mode is performed by front panel selector switch. In the N/revolution mode, the signal conditioner will operate with different signal pulse amplitudes that are either higher or lower than the remaining N/revolution pulses. Both 1/rev and N/rev tachometer signals may be positive, negative or bipolar voltages with an amplitude in the range from 100 mV to 200V peak to peak.

A panel mounted light emitting diode is pulsed briefly during each 1/rev cycle to indicate that the tachometer signal has been accepted by the conditioning unit. Shaft rotations above 1200 rpm will produce a constant illumination of the light emitting diode instead of a pulsing indication.

A tachometer reference output signal is provided for triggering other system circuitry or monitoring on an oscilloscope. When N/rev tachometer signals are used, a positive pulse reference signal is produced for the duration of the N/rev cycle immediately following the different height tachometer signal. A 1/rev tachometer signal produces a square wave reference signal which is in phase with the tachometer input signal. Both N/rev and 1/rev tachometer signals produce a 5V reference output signal.

DESCRIPTION OF THE PREFERRED EMBODIMENT

Figure 1:
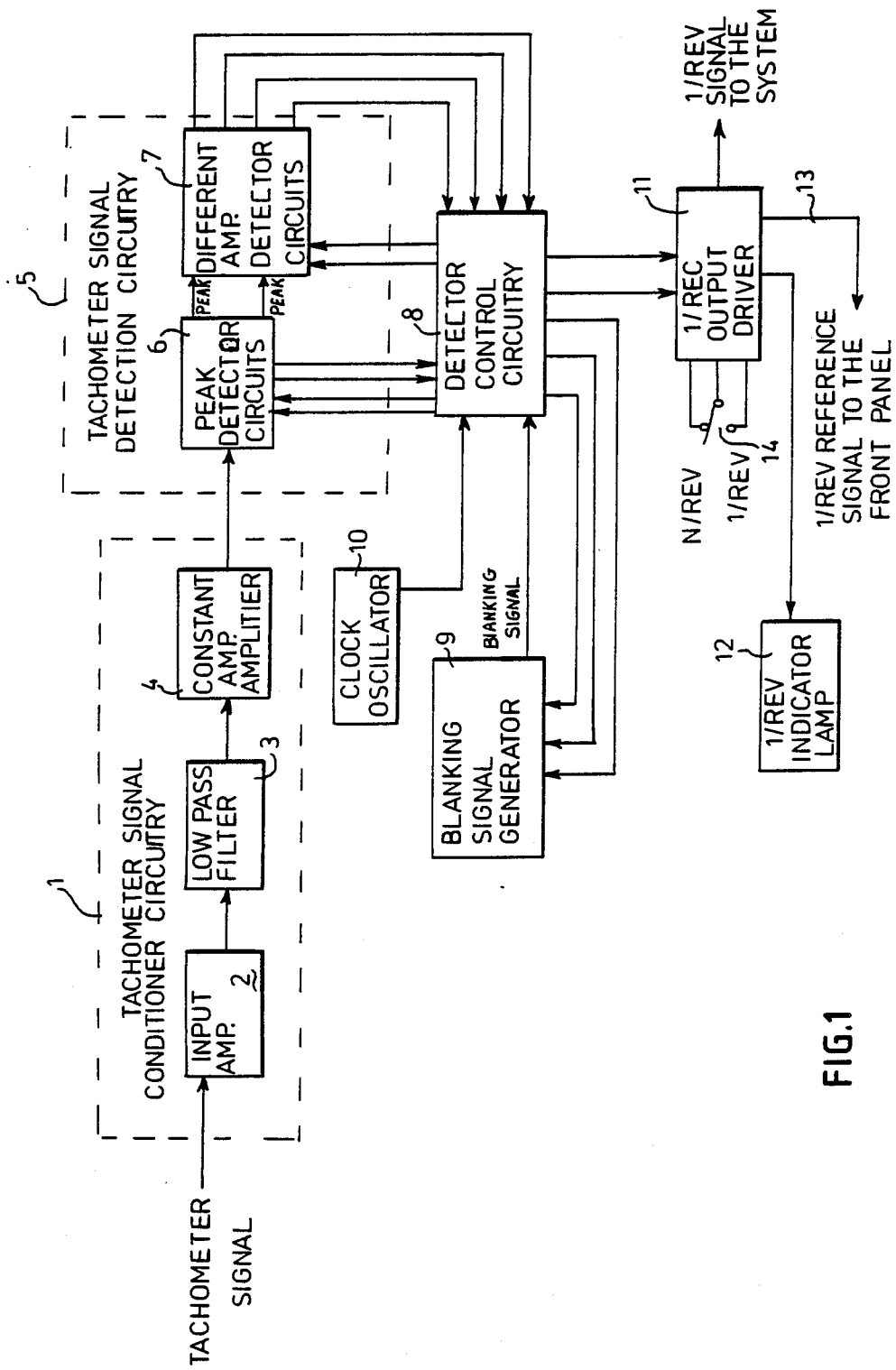
FIG. 1 is a schematic of the tachometer signal conditioner circuit of the present invention.

As is shown in FIG. 1 the tachometer signal conditioner of circuitry 1 comprises, in series, an input amplifier 2, a low-pass filter 3, and a constant amplitude amplifier 4. These three stages of the tachometer signal conditioning unit condition the tachometer signal amplitude to be an optimum peak value for detection of the reference angle information. Filtering is also performed on the signals to reduce the noise and increase detection reliability. The input amplifier stage 2, which can comprise resistor networks, attenuates the tachometer signal so that a 200V peak to peak tachometer signal can be handled by the unit. The second circuit phase consists of a low pass filter 3 with a 30 kHz cutoff frequency to eliminate noise and spurious spike signals above the filter pass band.

The filtered tachometer signal is fed to the constant amplitude amplifier stage 4, which produces a maximum output signal amplitude of 2V peak to peak for tachometer generated signals in the 100 mV to 200V peak to peak range. When the tachometer generator input signal to the unit has a continuous, fixed amplitude, the tachometer signal output from this stage will have a constant two volt amplitude. Tachometer signals with one odd height pulse that is repetitive each 1/rev cycle will produce an output signal which has an odd height pulse amplitude variation in proportion to the input signal amplitude change and a maximum amplitude of two volts.

The tachometer signal detection circuitry 5 comprises peak detector circuit 6 in series with different amplitude detector circuit 7. The tachometer signal detector circuitry produces digital pulses synchronous with the tachometer signal cycle and detects the occurrence of a tachometer signal with a different amplitude during each 1/rev period. A peak detector produces the synchronous digital signals. Signal level storage and voltage level comparison techniques are used to detect the occurrence of a different amplitude tachometer signal. The constant amplitude amplifier 4 output signal is sent to peak detector circuit 6 that produces voltage levels proportional to the positive and negative peak signal values. Digital pulses timed with the occurrence of the positive and negative peak are also produced by the peak detector circuit.

The positive and negative voltage levels are sent to the different amplitude detector 7 which stores the values and determines if those levels are substantially different from the positive and negative peak values of the previous tachometer signal. If a large difference is detected, digital signals are produced that indicate that a peak level change has been detected.

The tachometer signal detection circuit 5 works in conjunction with the detector control circuit 8 which controls the detection sequence. Digital pulse signals produced by the peak detector 6 during each tachometer signal cycle initiate the signal detection process. Dectector control circuitry 8 produces the digital signals that control the operation and resetting of peak detector circuits 6, and the gating of the different amplitude detector circuits 7. These control signals are derived from the clock oscillator 10 digital output signals by the detector control circuit 8, which produces short digital pulses, the duration of one-half a clock oscillator signal period, that control the peak detection, peak detector reset, and the amplitude detector gating at predetermined time intervals during each N/rev signal cycle. The control signals to tachometer signal detection circuitry 5 cause the positive and negative tachometer signal peak values currently being detected to be compared to the stored peak values of the previous tachometer signal.

If the different amplitude detector 7 senses a ten percent or greater amplitude change between two sequential tachometer signals, the digital signals that are produced initiate the generation of 1/rev pulse. This 1/rev pulse is produced during the N/rev signal cycle following the occurrence of the amplitude change and lasts for one complete N/rev signal period.

The blanking signal generator 9 produces a signal which prevents tachometer signal noise from generating spurious 1/rev pulses during operation in the N/rev mode. When a 1/rev pulse is produced by the detector control circuit 8, a blanking signal prevents the production of additional 1/rev pulses during the remainder of the 1/rev cycle.

The blanking pulse, which has a duration slightly less than the period for one shaft revolution, is applied to a gate in the detection control circuit to block any additional 1/rev pulses that may be generated by noise on the tachometer signal. The blanking signal ends just before the true 1/rev pulse is generated, allowing this pulse to pass through to the 1/rev output driver circuit 11.

The output driver circuit 11 produces signals to the remaining system circuitry, an output connector 13, and a front panel indicator light 12.

The driver circuit 11 receives a pulse signal from the peak detector circuit 6 and the pulse signal generated by the detector control circuit 8. The position of the N/rev-1/rev switch 14 determines which of the two signals is used to produce the 1/rev output signal.

It will be apparent that many alterations and modifications can be made to the circuitry which is disclosed. Therefore, it is the object of the appended claims to cover all such variations and modifications as come within the true spirit and scope of this invention.

What is claimed is:

1. A tachometer signal conditioner circuit for producing a phase reference signal from a machine shaft rotation comprising:
   means for detecting the positive and negative peaks of a tachometer output signal during each cycle of said: tachometer; and
   differential amplitude means connected to one or more outputs of said means for detecting and functioning to compare a signal proportional to said positive and negative peaks with stored proportional peak values from said tachometer's previous cycle, and to produce an output if the difference between said peak values and said stored proportional peak values exceeds a preset level.

2. The circuit of claim 1 wherein said means for detecting comprises peak detector circuits which produce voltage levels proportional to the positive and negative peak signal values which are connected to said differential amplitude means.

3. The circuit of claim 1 further comprising a detector control circuit having inputs from said means for detecting which comprise digital pulses coincident with said peak tachometer output signals and an input from said differential amplitude means; and an output driver which receives a pulse signal from said means for detecting which coincides with said peak tachometer output signals and a pulse signal from said detector control circuit, and which correspondingly outputs signals corresponding to one pulse per shaft revolution to an output connector and to an indicator light.

4. The circuit of claim 3 further comprising a switch connected to said output driver which functions to switch said output driver output from said one pulse per shaft revolution to N pulses per shaft revolution.

5. The circuit of claim 4 further comprising a blanking signal generator connected to said detector control circuit and functioning, when one of said one per shaft revolution pulses is produced by the detector control circuit, to generate a blanking signal which prevents the production of additional one per shaft revolution pulses during the remainder of a full shaft revolution.

* * * * *